US011225315B2

(12) United States Patent
Way (10) Patent No.: US 11,225,315 B2
(45) Date of Patent: Jan. 18, 2022

(54) AIRCRAFT WING TIPS (71) Applicant: AIRBUS OPERATIONS LIMITED, Bristol (GB)

(72) Inventor: Simon Way, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 140 days.

(21) Appl. No.: 16/668,814

(22) Filed: Oct. 30, 2019

(65) Prior Publication Data
US 2020/0172227 A1 Jun. 4, 2020

(30) Foreign Application Priority Data
Oct. 31, 2018 (GB) .................................... 1817770

(51) Int. Cl.
*B64C 3/48* (2006.01)
*B64C 3/54* (2006.01)
*B64C 3/56* (2006.01)
*B64C 13/50* (2006.01)

(52) U.S. Cl.
CPC ................ *B64C 3/48* (2013.01); *B64C 3/546* (2013.01); *B64C 3/56* (2013.01); *B64C 13/50* (2013.01)

(58) Field of Classification Search
CPC .. B64C 3/48; B64C 3/546; B64C 3/56; B64C 13/50
See application file for complete search history.

(56) References Cited

U.S. PATENT DOCUMENTS

| 5,114,104 A * | 5/1992 | Cincotta ................... B64C 3/48 |
| | | 244/219 |
| 5,662,294 A | 9/1997 | Maclean et al. |
| 5,988,563 A | 11/1999 | Allen |
| 2016/0233410 A1 | 8/2016 | Wilkie et al. |
| 2017/0073062 A1 | 3/2017 | Firth |
| 2017/0190410 A1* | 7/2017 | Good ........................ B64C 3/56 |
| 2018/0043985 A1 | 2/2018 | Thompson |

(Continued)

FOREIGN PATENT DOCUMENTS

| EP | 2 955 102 | 12/2015 |
| WO | 2017/118832 | 7/2017 |

OTHER PUBLICATIONS

Combined Search and Examination Report for GB1817770.9, dated Apr. 26, 2019, 5 pages.

(Continued)

*Primary Examiner* — Rodney A Bonnette
(74) *Attorney, Agent, or Firm* — Nixon & Vanderhye P.C.

(57) ABSTRACT

An aircraft wing having a fixed root part hingedly connected to a moveable tip part is disclosed. The tip part is configured to pivot relative to the root part about a substantially horizontal axis, between a load-alleviating configuration in which the tip part is oriented relative to the root part such that at least one of the upper and lower surface of the tip part is positioned away from the respective surface of the root part and a flight configuration in which the upper and lower surfaces of the tip part are continuations of the upper and lower surfaces of the root part. The shape of the tip part is controllably switchable between a cruise shape in which the tip part has positive camber and a recovery shape in which the tip part has negative camber.

16 Claims, 5 Drawing Sheets

(56) References Cited

U.S. PATENT DOCUMENTS

2018/0099735 A1* 4/2018 Kelly .................... B64C 23/072

OTHER PUBLICATIONS

Hartl, DJ, et al., "Aerospace applications of shape memory alloys", Proc. IMechE vol. 221 Part G: J. Aerospace Engineering, Special Issue Paper, pp. 535-552, Apr. 13, 2007.

Kamlet, M., "NASA Tests New Alloy to Fold Wings in Flight", six pages, Jan. 18, 2018: retrieved from the internet: <https://www.nasa.gov/centers/armstrong/feature/nasa-tests-new-alloy-to-fold-wings-in-flight.html>.

Extended European Search Report for European Application No. 19203006.2, 10 pages, dated Mar. 13, 2020.

* cited by examiner

AIRCRAFT WING TIPS

CROSS RELATED APPLICATION

This application claims priority to United Kingdom (GB) Patent Application 1817770.9, filed Oct. 31, 2018, the entire contents of which are hereby incorporated by reference.

TECHNICAL FIELD

The present invention relates to an aircraft wing having a fixed root part hingedly connected to a moveable tip part, and also to a method of moving, during flight, a tip part of an aircraft wing from an upwardly-folded position relative to a root part of the aircraft wing to a non-folded position.

BACKGROUND

Aircraft with moveable wing tip devices attached to fixed wings are known to those skilled in the art. The wing tip devices are typically used to allow load alleviation during flight, for example, in the event of wind gusts. Typically, large loads cause the wing tip device to move from a flight configuration in which the wing tip device is effectively a continuation of the fixed wing portion to a load-alleviating configuration in which the load on the wing is reduced. Once the cause of the requirement to enter the load-alleviating configuration has passed, it is often desirable to move the wing tip device back into the flight configuration. This is typically done using an actuator. Typically, the larger the force required, the larger and heavier the actuator.

The present invention seeks to provide an improved way of moving the wing tip device of an aircraft from a load-alleviating configuration to the flight configuration.

SUMMARY

A first aspect of the present invention provides an aircraft wing having a fixed root part hingedly connected to a moveable tip part. The tip part is configured to pivot relative to the root part about a substantially horizontal axis, between a load-alleviating configuration in which the tip part is oriented relative to the root part such that at least one of the upper and lower surface of the tip part is positioned away from the respective surface of the root part and a flight configuration in which the upper and lower surfaces of the tip part are continuations of the upper and lower surfaces of the root part. The shape of the tip part is controllably switchable between a cruise shape in which the tip part has positive camber and a recovery shape in which the tip part has negative camber.

Optionally, in the recovery shape a trailing edge of the tip part is deflected upwardly relative to its position in the cruise shape.

Optionally, the switching of the tip part between the cruise shape and the recovery shape is dependent on the temperature of at least a region of the tip part.

Optionally, the tip part comprises a deformable component that is controllably switchable between a first shape and a second shape. Optionally, the tip part is configured such that the deformable component having the first shape causes the tip part to have the cruise shape and the deformable component having the second shape causes the tip part to have the recovery shape.

Optionally, the first shape of the deformable component is substantially planar, and the deformable component is oriented within the tip part such that when the deformable component has the first shape it is substantially parallel to the chordwise and spanwise axes of the wing.

Optionally, the second shape of the deformable component is a deformed plane that is bent such that a leading edge of the deformable component is in the plane of the substantially planar first shape and a trailing edge of the deformable component extends out of the plane of the substantially planar first shape.

Optionally, the deformable component is comprised in a trailing edge of the tip part.

Optionally, the trailing edge comprises the deformable component sandwiched between two portions of flexible material.

Optionally, the portions of flexible material are aerodynamically shaped to form the trailing edge of an aerofoil structure.

Optionally, the deformable component is configured to switch from the first shape to the second shape in response to the temperature of the deformable component exceeding a predefined threshold temperature.

Optionally, the tip part further comprises a heater configured to increase the temperature of the deformable component.

Optionally, the heater comprises an electrical heating element configured to receive control signals from a remote controller.

Optionally, the wing comprises an electrical connection between the root part and the tip part for supplying power and/or control signals to the heating element.

Optionally, the aircraft wing further comprises an actuator for driving pivoting movement of the tip part, wherein the maximum torque able to be generated by the actuator is less than a torque expected to be required to move the tip part from the load-alleviating configuration to the flight configuration during flight when the tip part has the cruise shape.

A second aspect of the present invention provides a method of moving, during flight, a tip part of an aircraft wing from an upwardly-folded position relative to a root part of the aircraft wing to a non-folded position. The method comprises altering the aerodynamic profile of the tip part from a profile having a positive camber to a profile having a negative camber; and allowing the tip part to rotate downwardly relative to the root part under the influence of aerodynamic force.

Optionally, the method further comprises driving the tip part to move downwardly relative to the root part using an actuator, simultaneously with allowing the tip part to rotate downwardly under the influence of aerodynamic force.

Optionally, altering the aerodynamic profile of the tip part comprises raising the temperature of a shape memory alloy component of the tip part until the shape memory alloy component is caused to transition from a first shape corresponding to the positive camber aerodynamic profile to a second shape corresponding to the negative camber aerodynamic profile.

BRIEF DESCRIPTION OF THE DRAWINGS

Embodiments of the invention will now be described, by way of example only, with reference to the accompanying drawings, in which:

FIG. 1b is a close-up view of the tip of the wing of the aircraft of FIG. 1a;

FIG. 4b is a plan view of the example wing of FIG. 4a;

DETAILED DESCRIPTION

Each example wing according to the invention has a fixed root part hingedly connected to a moveable tip part. The tip part is configured to pivot relative to the root part about a substantially horizontal axis, between a load-alleviating configuration in which the tip part is oriented relative to the root part such that at least one of the upper and lower surface of the tip part is positioned away from the respective surface of the root part and a flight configuration in which the upper and lower surfaces of the tip part are continuations of the upper and lower surfaces of the root part. In each example wing according to the invention the shape of the tip part is controllably switchable between a cruise shape in which the tip part has positive camber and a recovery shape in which the tip part has negative camber. The example wings according to the invention seek to reduce or eliminate the force required by an actuator to move the tip part from the load-alleviating configuration to the flight configuration.

Figure 1A:
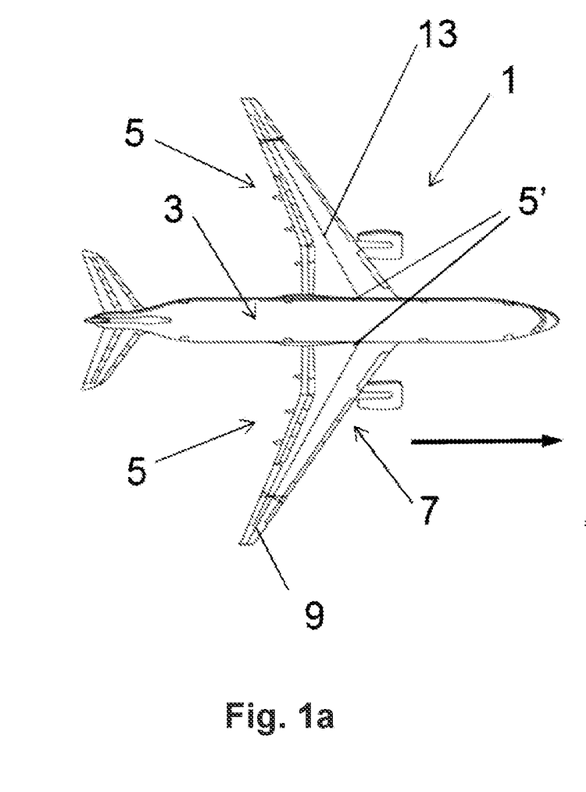
FIG. 1a is a plan view of an example aircraft having a wing according to the invention.
Figure 1B:
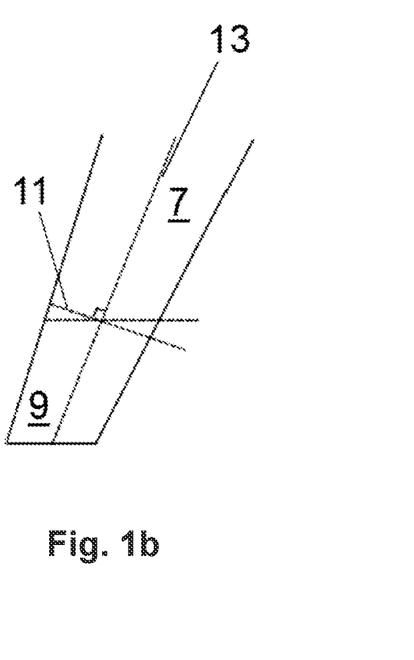

FIG. 1a is a plan view of an example aircraft 1 according to the invention. The aircraft comprises a central fuselage 3 and two main wings 5 extending outwardly from respective wing roots 5'. Each wing 5 comprises a fixed root part 7 and a moveable tip part 9, in the form of a planar wing tip extension. The tip part 9 is rotatably mounted about a hinge 11 that is orientated perpendicular to the swept mid-chord axis 13. This hinge 11, is thus non-parallel to the line of flight direction (the line of flight direction being shown in FIG. 1b for comparison).

Figure 2A:
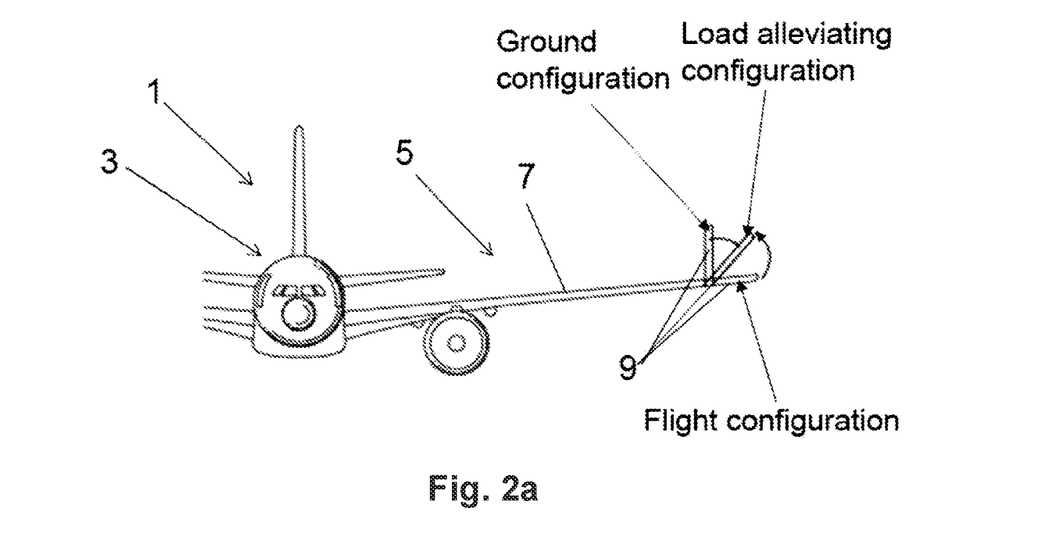
FIG. 2a is a partial front view of the aircraft of FIG. 1a, showing various positions of a moveable wing tip.
Figure 2B:
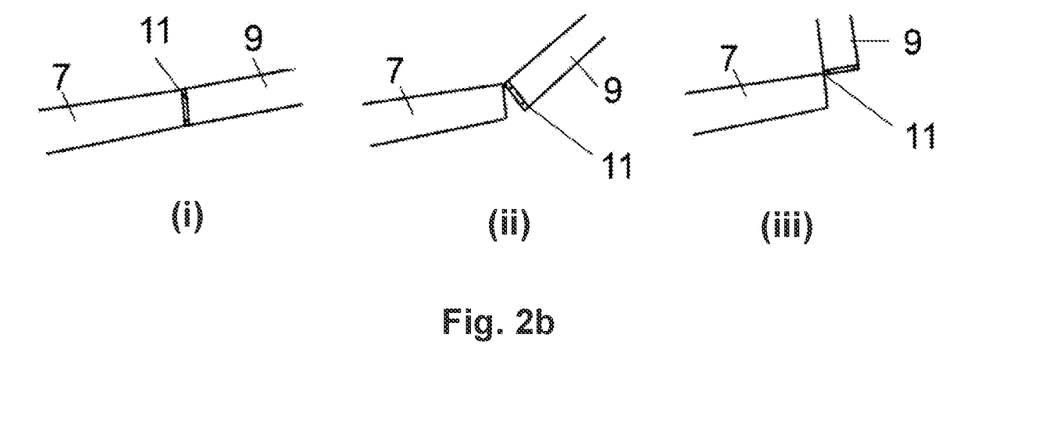
FIG. 2b is a close-up front view of the wing tip joint in three different positions relative to a root part of the wing.

Referring now to FIGS. 2a and 2b, the tip part 9 is rotatable about the hinge 11 from a flight configuration to a load alleviating configuration. In the flight configuration, the tip part 9 is an extension of the fixed root part 7. Accordingly the upper and lower surfaces of the root part 7 are continuous with the upper and lower surfaces of the tip part 9 (see FIG. 2b(i) and the lowermost position in FIG. 2a). The leading and trailing edges of the root part 7 are also continuous with the respective leading and trailing edges of the tip part 9 (see FIGS. 1a and 1b). Such an arrangement is beneficial as it provides a relatively large wing span, thereby providing an aerodynamically efficient aircraft. However a large span can result in correspondingly large loads on the wing 5, particularly a large wing root bending moment, especially during high load events such a gusts or extreme manoeuvres. The wing 5 must be sized to cope with these maximum loads, which can result in a relatively heavy wing. The ability of the tip part 9 to move to the load alleviating configuration (see FIGS. 2a and 2b(ii)) seeks to address that problem.

As shown in FIG. 2b(ii) and the middle position in FIG. 2a, the tip part is rotatable, upwards, such that the lower surfaces between the fixed root part 7 and the tip part 9 are no longer continuous with one another. Furthermore, since the hinge 11 is angled with respect to the streamwise direction, when the tip part 9 rotates upwardly its mean incidence is reduced. In this configuration the loads on the wing 5 that are generated by the tip part 9 are significantly reduced. The tip part 9 is moveable to this configuration during flight (described in more detail below). By providing this load alleviation function during flight, the maximum load the wing needs to be designed for may be reduced, and thus the wing 5 can be made relatively lightweight.

As used in this specification, the terms "upwards", "upwardly, "downwards", "downwardly", and the like are defined relative to the structure of the aircraft. Thus, "up" and "down" will align with the vertical direction when the aircraft is flying horizontally or is on the ground, but in some scenarios (such as when an aircraft is executing a banked turn), the up and down directions will not align with the vertical direction.

The tip part 9 may also be configurable to a ground configuration in which the tip part 9 is rotated yet further, to a substantially upright position (shown in FIG. 2b(iii) and the upright position in FIG. 2a). The tip part 9 is moveable to the ground configuration when the aircraft 1 is on the ground. When the tip part 9 is in the ground configuration the span of the aircraft 1 is sufficiently small to meet airport compatibility gate limits. Thus, the aircraft 1 can have a large span (exceeding gate limits) during flight, but is still able to comply with gate limits when on the ground.

Movement of the tip part 9 between the flight configuration and the ground configuration may be effected by an actuator. For example, the aircraft 1 may comprise a motor connected to a drive shaft that forms the shaft of the hinge 11. The motor is arranged to rotate the drive shaft such that the tip part 9 moves from the flight configuration (see FIG. 2b) to the ground configuration (see FIG. 2b) by actuation of the motor 15. This typically occurs shortly after landing to enable the aircraft to comply with airport gate limits. The motor may also be arranged to effect this movement in reverse before take-off, to move the tip part 9 from the ground configuration to the flight configuration, once the aircraft has cleared the gate.

When the aircraft 1 is flying and the tip part 9 is in the flight configuration, there tends to be a significant force on the tip part 9 (typically upwards). The wing 5 may therefore comprise a locking or restraining mechanism to maintain the tip part 9 in the flight configuration during flight. An example of a suitable locking/restraining mechanism is described in WO/2017/118832. The locking/restraining mechanism is releasable in the event of an unusually large load being experienced by the tip part 9 (e.g. due to a strong gust of wind), to enable the tip part 9 to move to the load alleviating configuration. This means the wing 5 can avoid being subjected to high gust loadings. This in turn may enable the wing 5 to have a relatively large span, without necessarily having to incur the associated weight penalty, because it can be designed for a lower magnitude of maximum load. The tip part 9 may be moveable to the load alleviating configuration purely under the action of aerodynamic force acting on it during flight, or under the gust loads. Alternatively, in some examples the wing 5 comprises a mechanism (such as a pre-loaded spring) for assisting the movement of the tip part 9 from the flight configuration to the load-alleviating configuration.

Figure 3:
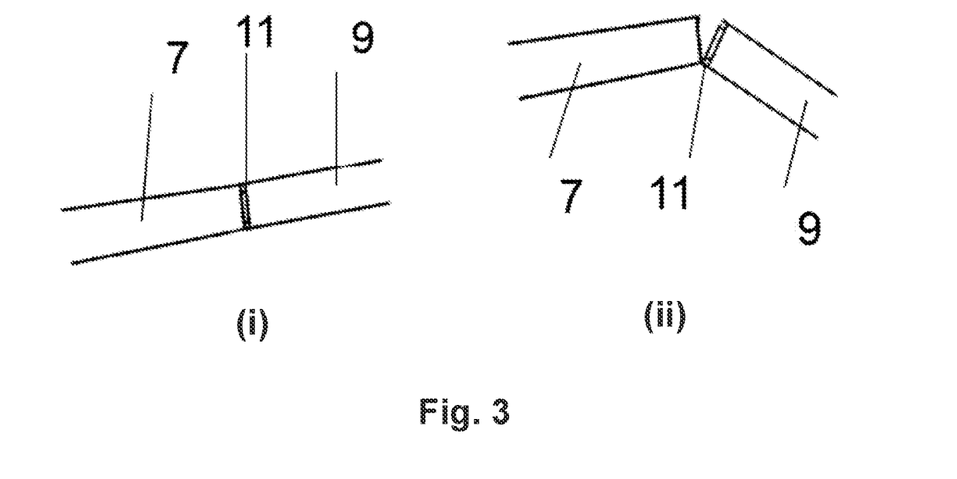
FIG. 3 is a close-up front view of an example wing tip joint having a double hinge, in two different positions relative to a root part of the wing.

In some examples, as illustrated by FIG. 3, the hinge 11 may be a double hinge for allowing both upward and downward rotation of the tip part 9 to the load alleviating configuration (only the downward rotation being illustrated in FIG. 3, and the upward rotation being as per FIG. 2b). Such an arrangement enables both positive-g and negative-g loads to be alleviated.

As soon as the conditions causing the high load on the tip part 9 are no longer present, it is desirable to move the tip part 9 back to the flight configuration to regain the efficiency benefits of a large wing span. However; the aerodynamic force on the tip part 9 as a result of its aerofoil shape may generally act to resist it moving back to the flight configuration. The force required to move the tip part 9 from the gust-alleviating configuration to the flight configuration during flight may be significantly greater than the force required to move the tip part 9 from the flight configuration to the ground configuration when the aircraft is on the ground. An actuator sized for moving the tip part 9 between the flight configuration and the ground configuration when the aircraft 1 is on the ground will therefore generally not be able to exert enough force to move the tip part 9 from the load-alleviating configuration to the flight configuration during flight.

To reduce or eliminate the force required to move the tip part 9 from the load-alleviating configuration to the flight configuration during flight, the shape of the tip part 9 is controllably switchable between a cruise shape in which the tip part 9 has positive camber, and a recovery shape in which the tip part 9 has negative camber.

Figure 4A:
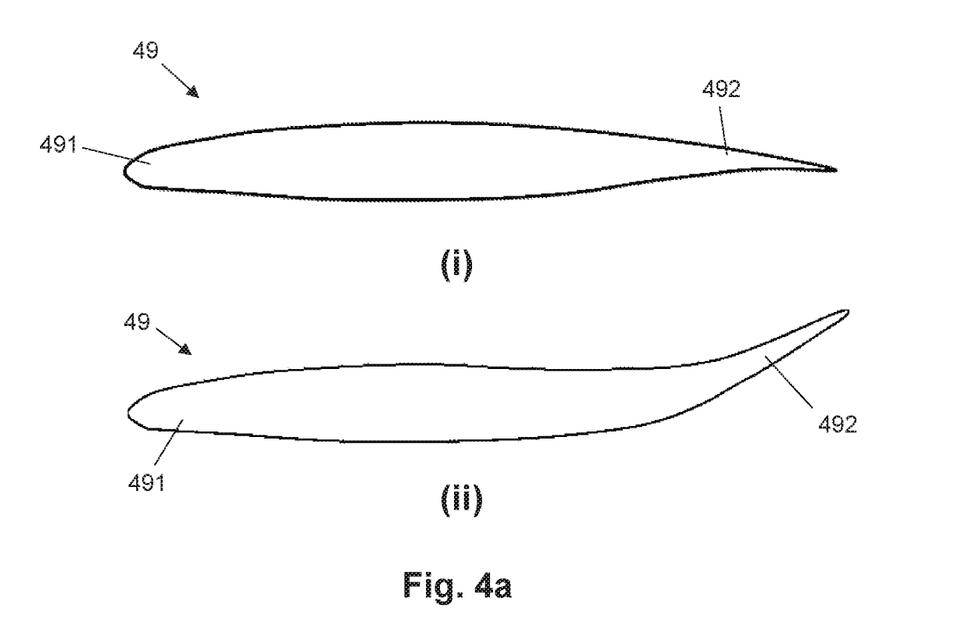
FIG. 4a is a cross section through an example tip part of an example wing according to the invention, in two different configurations.
Figure 4B:
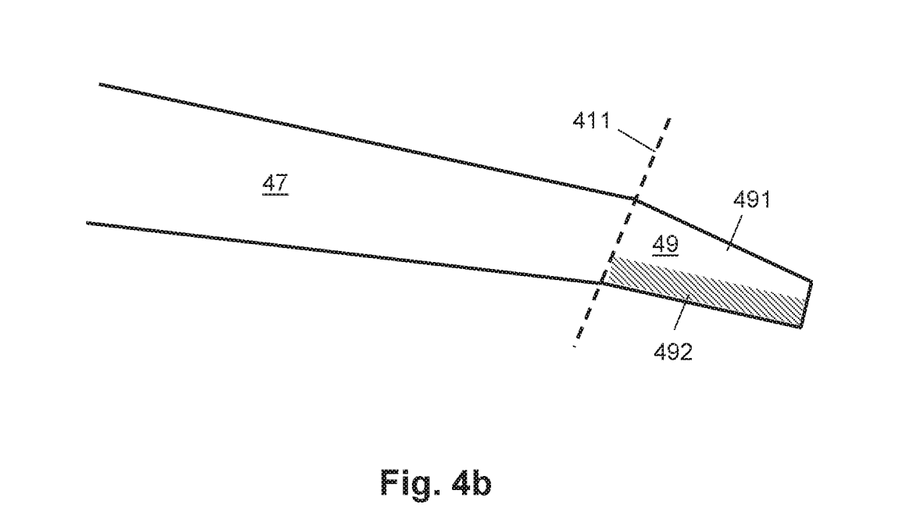

FIGS. 4a and 4b show an example tip part 49, attached to an example root part 47. The tip part 49 and root part 47 are relatively pivotable about a hinge line 411 and have the same features as the example tip part 9 and root part 7 of FIGS. 1-3, except that the tip part 49 is backswept relative to the root part 47. The tip part 49 has a leading edge region 491 and a trailing edge region 492. FIG. 4a shows the cross-sectional profile of the tip part 9 in the cruise shape (part (i)) and in the recovery shape (part (ii)) and FIG. 4b is a plan view of the tip part 49 and root part 47 in the flight configuration. In the recovery shape the trailing edge 492 of the tip part 49 is deflected upwardly (relative to a normal operational orientation of the tip part 49) relative to its position in the cruise configuration. The shaded area of the tip part 49 on FIG. 4b corresponds to the region of the tip part which experiences a change during a switch from the cruise shape to the recovery shape and vice versa.

When the tip part 49 is in the load alleviating configuration shown in FIG. 2b(ii) and in the cruise shape, as a result of the positive camber of the tip part 49, aerodynamic forces on the tip part 49 act to resist its return to the flight configuration. However; switching the tip part 49 to the negative camber recovery shape whilst the tip part 49 is in the load alleviating configuration causes the direction of the aerodynamic force to be generally downward rather than upward. The tip part 49 may thereby be returned to the flight configuration mostly or entirely under the action of aerodynamic force. An actuator for driving pivoting movement of the tip part 49 may therefore be sized such that the maximum torque able to be generated by the actuator is less than a torque expected to be required to move the tip part 49 from the load-alleviating configuration to the flight configuration during flight when the tip part has the cruise shape. Such an actuator may be sized to generate a torque sufficient for driving movement of the tip part 49 between the ground configuration and the flight configuration when the aircraft is on the ground. In some examples, e.g. examples in which the wing span of the aircraft is small enough that it is not required to be able to fold the tip parts when on the ground, there may not be any actuator provided to drive pivoting movement of the tip part 49.

Figure 5:
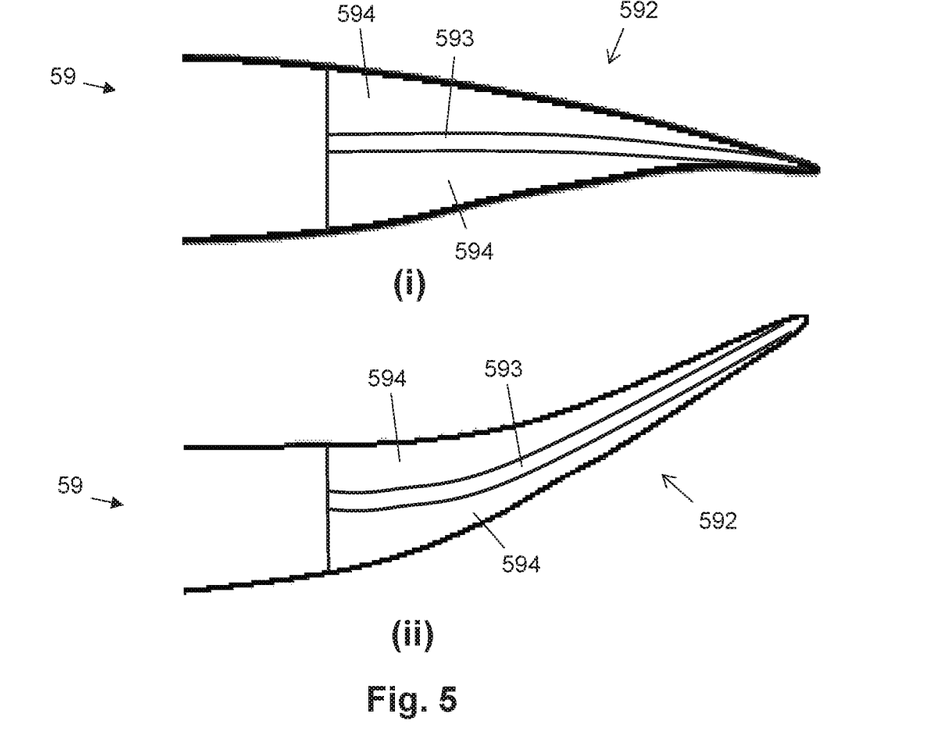
FIG. 5 is a partial cross-section through an example tip part of an example wing according to the invention, in two different configurations.
Figure 6:
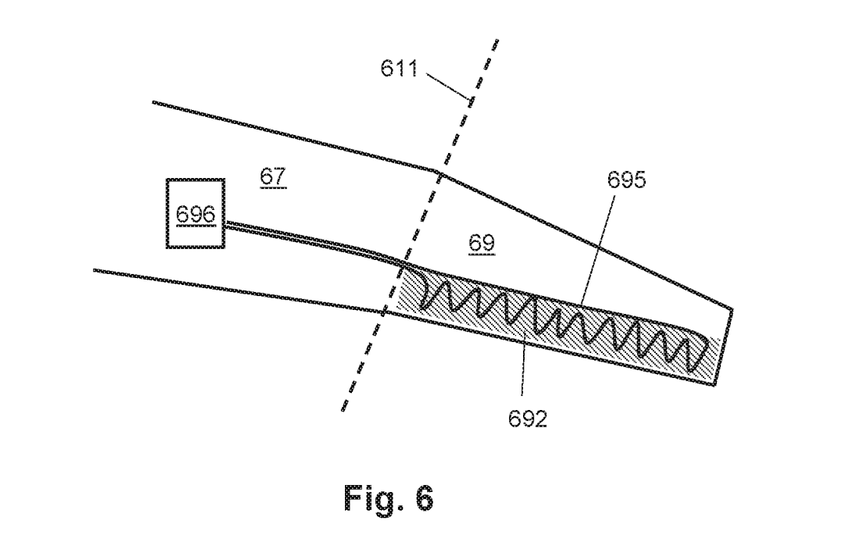
FIG. 6 is a top view of an example heating system of an example wing according to the invention.

FIGS. 5 and 6 show a particular implementation of an example tip part 59 according to the invention. FIG. 5 shows cross-sections through the trailing edge 592 (and FIG. 6 shows the trailing edges 692) of the tip part 59 in the cruise shape (part (i)) and in the recovery shape (part (ii)). The tip part 59 is constructed such that the switching of the tip part 59 between the cruise shape and the recovery shape is dependent on the temperature of at least a region of the tip part 59. In particular, the trailing edge 592 of the tip part 59 comprises a deformable component 593 that is controllably switchable between a first shape and a second shape. The deformable component 593 may be formed, for example, from a shape memory alloy (SMA) material. The tip part 59 is configured such that the deformable component 593 having the first shape causes the tip part 59 to have the cruise shape and the deformable component 593 having the second shape causes the tip part 59 to have the recovery shape. The deformable component 593 may extend across substantially the entire span of the tip part (e.g. such that it is present across the entire hatched area shown in FIG. 4b), or it may comprise multiple discrete portions distributed along the span.

In the particular example of FIG. 5 the first shape of the deformable component 593 (illustrated by FIG. 5(i)) is substantially planar. The deformable component 593 is oriented within the tip part 59 such that when the deformable component 593 has the first shape it is substantially parallel to the chordwise and spanwise axes of the wing in which the tip part 59 is comprised. The second shape of the deformable component 593 (illustrated by FIG. 5(ii)) is a deformed plane that is bent such that a leading edge of the deformable component 593 is in the plane of the first shape and a trailing edge extends out of the plane of the first shape. Thus, switching from the first shape to the second shape involves the trailing edge of the deformable component 593 moving upwardly and becoming angled relative to the leading edge, whilst the position and orientation of the leading edge remains the same.

The chordwise dimension of the deformable component (in the first shape) may be selected to enable a desired amount of upwards deflection of the trailing edge in the second shape. It is generally possible to achieve a greater amount of upwards deflection with a longer chordwise dimension. In general, the chordwise dimension of the deformable component may be 20-50% of the total chord length of the tip part 59 at any given spanwise location.

The deformable component 593 is sandwiched between two portions 594 of flexible material. The flexible portions 594 are aerodynamically shaped to form the trailing edge of an aerofoil structure. The flexible portions 594 together with the deformable component 593 form the trailing edge region 592 of the tip part 59. The flexible portions 594 may be made from any suitable flexible material such as an elastomeric material. The flexible material may be selected to be stiff enough to maintain an aerodynamic shape during flight, in both shapes of the tip part, but flexible enough to be readily deformed by a shape change of the deformable component 593. The rest of the tip part 59 (that is the leading edge region and the intermediate region between the leading edge region and the trailing edge region 592) is substantially rigid and may have any suitable construction. The trailing edge region 592 may be connected to the rest of the tip part 59 by any suitable mechanism. In some examples a flexible skin may encase the whole tip part 59, to ensure a continuous aerodynamic surface and minimize any steps or gaps where the trailing edge region 592 joins to the rest of the tip part 59.

The deformable component 593 is configured to switch from the first shape to the second shape in response to the temperature of the deformable component exceeding a predefined threshold temperature. This may be achieved, for example, by forming the deformable component from a two-way shape memory alloy (SMA) trained to remember the first shape at low temperatures (i.e. temperatures below the predefined threshold temperature) and the second shape at high temperatures (i.e. temperatures above the predefined threshold temperature). The threshold temperature is greater than any temperature that could naturally be reached by the deformable component during operation of an aircraft in which the tip part 59 is comprised. The exact material composition of the SMA may be selected in dependence on specific features of the particular application (e.g. the size of the tip part, the stiffness of the portions of flexible material, the size and shape of the deformable component, and the like). In order to controllable raise the temperature of the deformable component 593 to above the threshold temperature, the tip part 59 comprises a heater (not shown). The heater may be based on any suitable technology.

FIG. 6 shows a further example tip part 69 and root part 67 having a heater suitable for increasing the temperature of a deformable component comprised in the tip part 69. The root part 67 has the same features as the example root part 47 described above. The tip part 69 is pivotable about a hinge line 611 relative to the root part 67 and has the same features as the example tip part 59 described above. The heater comprises an electrical heating element 695 configured to receive control signals from a controller 696 that is remote from the heating element 695. By "remote" it is meant that the controller is not comprised in the tip part 69. The controller 696 may be, for example, in the root part 67 as shown in FIG. 6, or it may be elsewhere on the aircraft. The heating element 695 is a resistive heating element. The tip part 69 comprises a deformable component having the same features as the deformable component 593, which is present in the dashed region. The heating element 695 is arranged such that the deformable component is substantially evenly heated across its full area.

In the illustrated example the heating element 695 is connected to the controller 696 by a wired electrical connection for transmitting electrical signals between the controller and the heating element 695. The wired connection provides both electrical power and control signals to the heating element 695. The wired electrical connection is configured to remain intact in all possible relative positions of the tip part 69 and the root part 67. Other examples are possible in which the connection between the controller 696 and the heating element 695 is wireless. In such examples control and/or power signals may be transmitted between the controller 696 and the heating element 695 using any suitable wireless communications medium, such as RF waves or infrared waves. In some examples the heating element 695 receives electrical power from a local source provided on the tip part 69, such as a battery or solar cell.

The controller 696 is configured to activate the heating element 695 when it is desired to switch the tip part 69 from the cruise shape to the recovery shape. The controller 696 may be configured to operate the heating element 695 to maintain the temperature of the deformable component above the threshold temperature until it is desired to switch the tip part 69 back to the cruise shape from the recovery shape. The controller 696 may be configured to selectively operate the heating element 695 in a temperature increasing mode, in which the rate of transfer of thermal energy to the deformable component is relatively higher, and in a temperature maintenance mode in which the rate of transfer of thermal energy to the deformable component is relatively lower.

The tip part 69 may comprise a temperature sensor configured to measure the current temperature of the deformable component and to provide temperature information to the controller 696, in which case the controller 696 may control the heating element 695 (e.g. by selecting a mode of operation and/or varying an amount of electrical energy supplied to the heating element 695) based on the provided temperature information. The controller 696 may also be configured to receive configuration information about a current configuration of the tip part 69 (e.g. whether it is in the load-alleviating configuration or the flight configuration) and/or information about a current shape of the tip part 69 (e.g. whether it has the cruise shape or the recovery shape) and to control the heating element 695 based on such configuration information. The configuration information may be provided to the controller 696 by any suitable type of sensor(s). The controller 696 may also be configured to receive load information about a current load being experienced by the tip part 69 and to control the heating element 695 based on such load information. The load information may be provided to the controller 696 by any suitable type of sensor(s). In some examples the controller 696 may additionally be configured to receive control signals from another part of the aircraft, e.g. the cockpit, to enable direct control of the tip part shape by flight crew. The controller 696 may be configured to control the heating element 695 based on any combination of temperature information, configuration information, load information and control signals.

Figure 7:
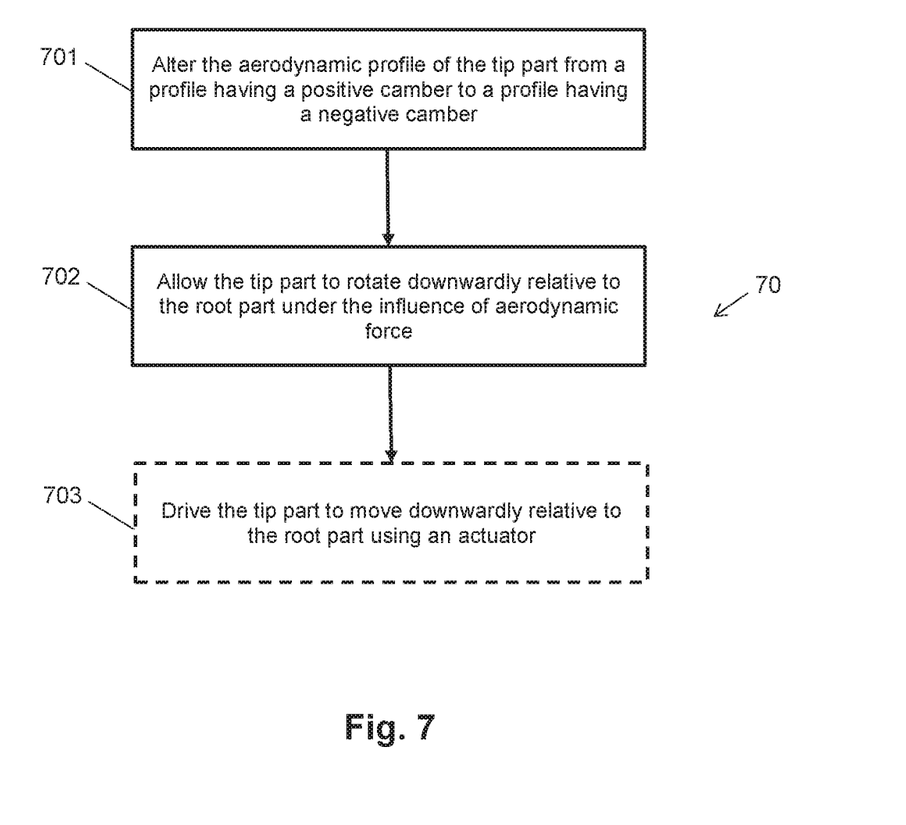
FIG. 7 is a flow chart illustrating an example method of recovering a wing tip from a load-alleviating configuration to a flight configuration according to the invention.

FIG. 7 is a flow chart illustrating an example method 70 of moving, during flight, a tip part of an aircraft wing from an upwardly-folded position relative to a root part of the aircraft wing to a non-folded position. The method may be implemented by any of the example aircraft wings according to the invention, including the examples specifically described above. The upwardly-folded position may correspond to, for example, the load-alleviating configuration of the example wings described above and the non-folded position may correspond to the flight configuration of those example wings.

In a first block 701, the aerodynamic profile of the tip part is altered from a profile having a positive camber to a profile having a negative camber. Altering the aerodynamic profile of the tip part may comprise switching the tip part from a cruise shape to a recovery shape, as described above in relation to the example aircraft wings of FIGS. 4-6. Altering the aerodynamic profile of the tip part may comprise raising the temperature of a shape memory alloy component of the tip part until the shape memory alloy component is caused to transition from a first shape corresponding to the positive camber aerodynamic profile to a second shape corresponding to the negative camber aerodynamic profile. Block 701 may be performed in response to the detection of certain environmental conditions, such as the presence or absence of a particular type of load on the tip part. Block 701 may be performed in response to a detection that the tip part is in the upwardly-folded position.

In a second block 702, the tip part is allowed to rotate downwardly relative to the root part under the influence of aerodynamic force. The aerodynamic force acts downwardly on the tip part and is generated by the interaction of the oncoming air flow with the negative camber of the tip part. The magnitude of the aerodynamic force depends on factors such as the speed of the airflow over the tip part, and the degree of the negative camber. Allowing the tip part to rotate downwardly may comprise simply not preventing the downwards rotation, at least until the tip part reaches the non-folded position. The downwards rotation of the tip part may be halted, for example by a structural stop or a braking mechanism, when the tip part is in the non-folded position. In some examples, allowing the tip part to rotate downwardly may comprise controlling the rate of the downwards rotation, e.g. using a damping mechanism.

In some examples, the method 70 comprises an optional block 703, in which the tip part is driven to move downwardly relative to the root part using an actuator. Block 703 may be performed simultaneously with block 702, such that the aerodynamic force provides a portion of the total torque required to rotate the tip part from the upwardly-folded position to the non-folded position, and the actuator provides the rest of the required torque. Alternatively or additionally, block 703 may be performed before or after block 702, such that the downwards rotation is initially driven by the actuator, but completed by aerodynamic force, or vice versa. In any case, the torque provided by the actuator is less than the total torque required to rotate the tip part from the upwardly-folded position to the non-folded position.

In some examples, the method 70 may be partially implemented by a controller on the aircraft. The controller may be, for example, a controller of a heating system such as the example controller 696 described above. The controller may be part of an avionics system of the aircraft.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. An aircraft wing having a fixed root part hingedly connected to a moveable tip part, wherein the tip part is configured to pivot relative to the root part about a horizontal axis, between a load-alleviating configuration in which the tip part is oriented relative to the root part such that at least one of the upper and lower surface of the tip part is positioned away from the respective surface of the root part and a flight configuration in which the upper and lower surfaces of the tip part are continuations of the upper and lower surfaces of the root part, and wherein the tip part comprises a deformable component which is controllably deformable to controllably switch the shape of the tip part between a cruise shape in which the tip part has positive camber and a recovery shape in which the tip part has negative camber.

2. An aircraft wing according to claim 1, wherein in the recovery shape a trailing edge of the tip part is deflected upwardly relative to its position in the cruise shape.

3. An aircraft wing according to claim 1, wherein the switching of the tip part between the cruise shape and the recovery shape is dependent on the temperature of at least a region of the tip part.

4. An aircraft wing according to claim 1, wherein the first shape of the deformable component is planar, and wherein the deformable component is oriented within the tip part such that when the deformable component has the first shape it is parallel to the chordwise and spanwise axes of the wing.

5. An aircraft wing according to claim 4, wherein the second shape of the deformable component is a deformed plane that is bent such that a leading edge of the deformable component is in the plane of the planar first shape and a trailing edge of the deformable component extends out of the plane of the planar first shape.

6. An aircraft wing according to claim 1, wherein the deformable component is comprised in a trailing edge of the tip part.

7. An aircraft wing according to claim 6, wherein the trailing edge comprises the deformable component sandwiched between two portions of flexible material.

8. An aircraft wing according to claim 6, wherein the portions of flexible material are aerodynamically shaped to form the trailing edge of an aerofoil structure.

9. An aircraft wing according to claim 1, wherein the deformable component is configured to switch from the first shape to the second shape in response to the temperature of the deformable component exceeding a predefined threshold temperature.

10. An aircraft wing according to claim 9, wherein the tip part further comprises a heater configured to increase the temperature of the deformable component.

11. An aircraft wing according to claim 10, wherein the heater comprises an electrical heating element configured to receive control signals from a remote controller.

12. An aircraft wing according to claim 11, wherein the wing comprises an electrical connection between the root part and the tip part for supplying power and/or control signals to the heating element.

13. An aircraft wing having a fixed root having a fixed root part hingedly connected to a moveable tip part, wherein the tip part is configured to pivot relative to the root part about a horizontal axis, between a load-alleviating configuration in which the tip part is oriented relative to the root part such that at least one of the upper and lower surface of the tip part is positioned away from the respective surface of the root part and a flight configuration in which the upper and lower surfaces of the tip part are continuations of the upper and lower surfaces of the root part, and wherein the shape of the tip part is controllably switchable between a cruise shape in which the tip part has positive camber and a recovery shape in which the tip part has negative camber, and
an actuator for driving pivoting movement of the tip part, wherein the maximum torque able to be generated by the actuator is less than a torque expected to be required to move the tip part from the load-alleviating configuration to the flight configuration during flight when the tip part has the cruise shape.

14. A method of moving, during flight, a tip part of an aircraft wing from an upwardly-folded position relative to a root part of the aircraft wing to a non-folded position, the method comprising:
altering the aerodynamic profile of the tip part from a profile having a positive camber to a profile having a negative camber; and
allowing the tip part to rotate downwardly relative to the root part under the influence of aerodynamic force.

15. A method according to claim 14, further comprising driving the tip part to move downwardly relative to the root part using an actuator, simultaneously with allowing the tip part to rotate downwardly under the influence of aerodynamic force.

16. A method according to claim 14, wherein altering the aerodynamic profile of the tip part comprises raising the temperature of a shape memory alloy component of the tip part until the shape memory alloy component is caused to transition from a first shape corresponding to the positive camber aerodynamic profile to a second shape corresponding to the negative camber aerodynamic profile.

\* \* \* \* \*